United States Patent [19]

Languillat

[11] Patent Number: 4,591,405

[45] Date of Patent: May 27, 1986

[54] APPARATUS FOR TRUNCATING CONTINUOUSLY FORMED TUBES

[75] Inventor: Jean-Paul Languillat, Vallieres par Thorigny sur Oreuse, France

[73] Assignee: Lhomme S.A., Pont sur Yonne, France

[21] Appl. No.: 605,668

[22] Filed: Apr. 30, 1984

[30] Foreign Application Priority Data

May 10, 1983 [FR] France ............................... 83 07802

[51] Int. Cl.4 .................. B32B 29/00; B32B 31/18
[52] U.S. Cl. .................... 156/446; 156/184; 156/250; 156/510; 156/523; 82/53.1
[58] Field of Search ............... 156/184, 195, 250, 426, 156/446, 457, 448, 510, 523; 82/53.1

[56] References Cited

U.S. PATENT DOCUMENTS

| | | | |
|---|---|---|---|
| 2,334,887 | 11/1943 | Siegerist | 82/53.1 |
| 3,254,549 | 6/1966 | Ronai | 82/53.1 |
| 3,611,848 | 10/1971 | Sullivan et al. | 82/53.1 |
| 3,756,128 | 9/1973 | Armstrong et al. | 82/53.1 |

FOREIGN PATENT DOCUMENTS

| | | |
|---|---|---|
| 2231089 | 1/1974 | Fed. Rep. of Germany . |
| 2738136 | 3/1979 | Fed. Rep. of Germany . |
| 626275 | 9/1927 | France . |
| 1599934 | 8/1970 | France . |
| 2370582 | 6/1978 | France . |

Primary Examiner—Caleb Weston
Attorney, Agent, or Firm—Sandler & Greenblum

[57] ABSTRACT

Apparatus for truncating a continuously formed cellulosic tube, which is rotated and translated as it is being formed and has a free end that moves in an axial direction as the tube is formed, includes a carriage mounted for translation in said axial direction between forward and rearward positions. The apparatus includes a translatable abutment that engages the free end of the tube for movement therewith in response to engagement. The carriage is coupled to to the abutment for translating the carriage from its rearward position in response to forward movement of the tube. A cutter is mounted on the carriage for transverse movement relative to the axis of the tube; and a cam follower engaged with a cam surface is operatively connected to the cutter. The cam follower/cam surface are constructed and arranged so that, in response to forward translation of the carriage, the cutter moves transversely into cutting engagement with the tube.

20 Claims, 4 Drawing Figures

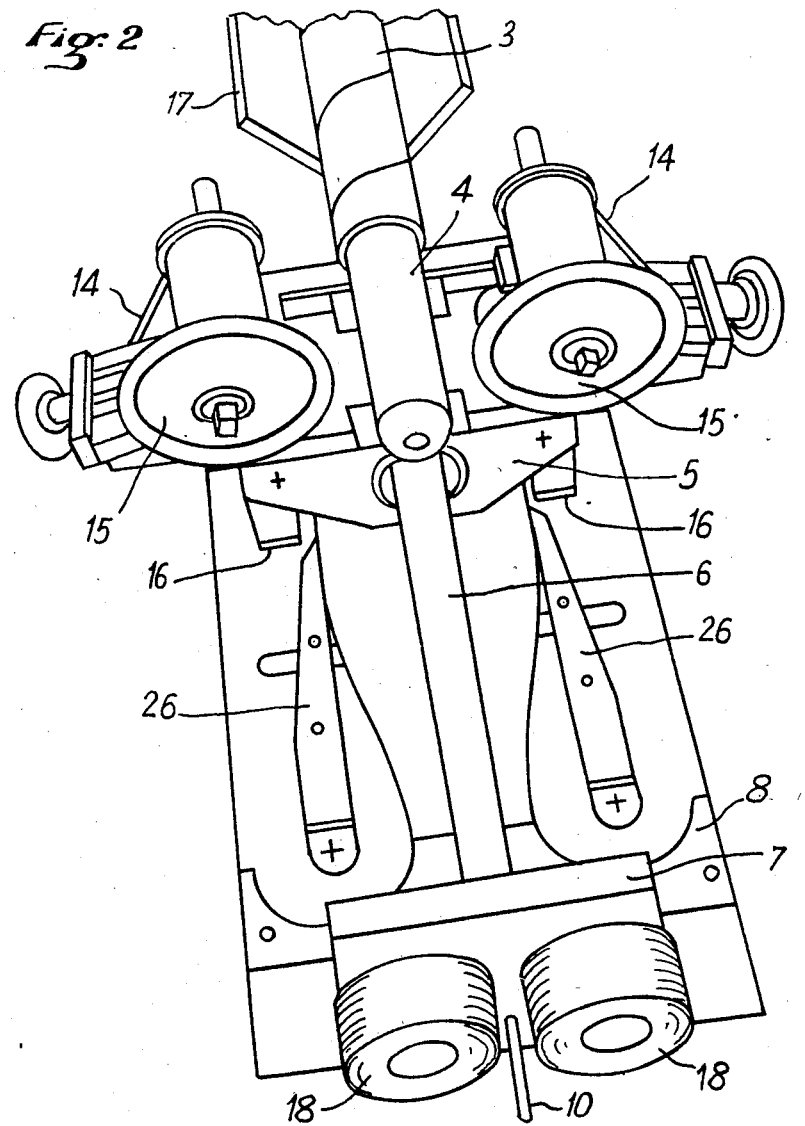
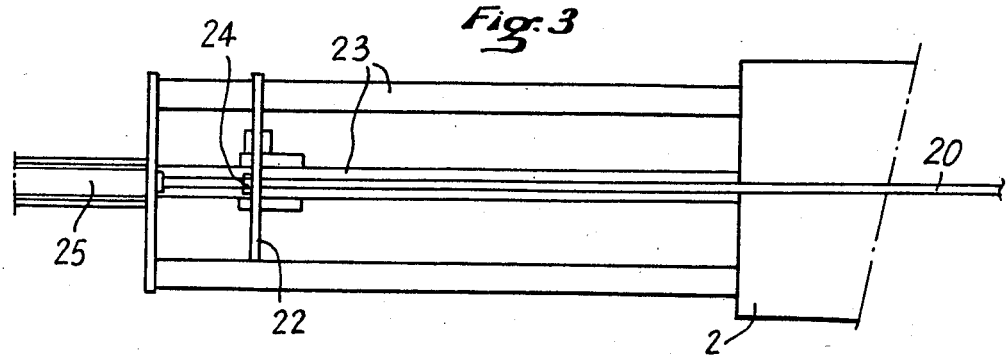

APPARATUS FOR TRUNCATING CONTINUOUSLY FORMED TUBES

BACKGROUND OF THE INVENTION

1. Field of the Invention

The invention relates to apparatus for truncating continuously formed tubes, such as tubes of cellulosic material.

2. Description of Material Information and Pertinent Materials

Cardboard tubes are conventionally manufactured by winding a plurality of strips of paper or cardboard helically on a machine known as a "spiraler". A known machine for accomplishing this comprises a fixed cylindrical mandrel on which one or more strips are helically wound. The spiral edges of the strips form predetermined angles with the axis of the mandrel. If more than one strip is used in forming the tube, the strips are connected in series by glueing an end of one strip to an end of another strip so as to form a continuous band of desired length for wrapping around the mandrel. The tube so formed is simultaneously rotated and longitudinally translated by an endless conveyor belt effecting a dead turn around the tube.

As a continuous tube of cardboard is formed, it is truncated into individual tubes at a cutting or truncating station. Conventional truncating apparatus normally is operated in a cyclical manner. Actuation of the cutters is synchronized to the velocity of advancement of the tube formed relative to the length of the truncated portions to be obtained.

Obviously, it is necessary for the cutters to follow the tube during truncation for a certain time period so as to obtain a cut along a vertical section, i.e., along a plane perpendicular to the axis of the tube. Certain known systems to accomplish these ends comprise a cutter in the form of a circular saw mounted on a movable carriage, and a means for thrusting the saw, in a direction transverse to the longitudinal movement of the tube, into contact with the tube. The action of the saw and the movement of the carriage are controlled in a manner such that the saw penetrates transversely into the tube at the desired moment while following longitudinal movement of the tube during cutting action of the saw.

Another known system controls a saw in a cyclical, rotating movement such that the period of movement is a function of the velocity of advancement of the tube and the length of the truncations to be obtained, so that longitudinal movement of the saw occurs during cutting at substantially the same velocity as the advancement of the tube.

However, these known saw apparatus suffer from numerous disadvantages with respect to the quality of the cut. In this regard, a clean cut is often difficult to obtain. Thus, the end of the tube may have rough edges or burrs. As a result, excessive saw dust is produced. Moreover, such saws are dangerous because they are positively driven and can be activated at times when there is no work to be cut.

In an attempt to overcome these problems, high performance systems, using circular knives, that cooperate with a support mandrel positioned within the cardboard tube, have been used with some success. Such systems make it possible, during each cycle of operation, to cut one or more tube portions along a straight (vertical) cross-section, and obtain essentially smooth edges which are practically free of burrs.

Conventional knife cutting systems generally comprise three elements:

(a) a support and guide elements for the cardboard tube in the form of cylindrical rollers and wheels;
(b) a cylindrical support mandrel, generally of very hard material, positioned within the tube; and
(c) cutting knives or saws in the form of disks which are attached onto rigid or elastic supports.

The above three types of elements (a), (b), (c) are operatively interconnected. As such, one or more of these elements is moved along the axis of rotation so as to result in truncation of a tube at the moment of penetration of the knives into the wall of the tube. During truncation, all of the elements are longitudinally displaced at a velocity synchronized with longitudinal advancement of the tube.

This displacement, or shifting movement, may be achieved by electrical, hydraulic, pneumatic, or equivalent activating means whose action is adjusted proportionally either to the velocity of operation of the feed means for the tube, or to the velocity of the unwinding of the strips of paper or cardboard.

Providing the tube with a reference element is sometimes used as part of a system for coordinating the movement of these means. In such instance, a reader follows this reference element in a manner so as to sense and send information to a control element of the activation means which coordinates the displacement.

In addition, hydraulic, pneumatic, mechanical or electric activation means may also be used to effect the penetration of the knives into the tubes until they meet the support mandrel.

Thus, all of these systems are complex, costly and of dubious safety and reliability.

SUMMARY OF THE INVENTION

It is, therefore, an object of the invention to provide a simple apparatus for truncating tubes made from cellulosic materials such as paper and cardboard.

Another object of the invention is to provide a more reliable apparatus whose maintenance is less expensive and which is nevertheless very safe.

Yet another object of the invention is to provide an apparatus which is less costly to manufacture.

The truncating apparatus according to the present invention comprises guide means for the formed tube, at least one knife positioned on a movable carriage and a support, and an interior support mandrel or chuck positioned within the formed tube.

In accordance with the present invention, a movable carriage, on which a knife-carrier is mounted, is longitudinally, and translationally driven in the forward direction of movement of the tube after its forward free end engages an abutment connected to the carriage. Movement of the carriage in synchronism with the forward movement of the tube causes a knife, or knives, mounted on a support carried by the carriage to move transversely, simultaneously, and to penetrate the wall of the tube thereby severing a section from the tube. Thus, the transverse movement of the support on which the knife is mounted, while the carriage on which the support is carried moves longitudinally with and at the same speed as the tube, ensures perfect synchronism between the knife and tube at the moment of truncation. After truncation, other means are effective to return the carriage to its initial position by reverse translation after each truncation.

Preferably, movement of the interior support mandrel is not controlled by the truncating action of the knives. Rather, the mandrel is driven in translation and in rotation during this phase during its contact with the internal wall of the tube. Means are provided for returning the mandrel to its initial position after each truncation.

Preferably, the means for causing the knife or knives to penetrate the tube comprise at least one support which carries at least one knife positioned perpendicularly to the axis of the tube. Such support is journalled on the carriage and initially biased towards a position spaced from the tube. The means for causing the knife to penetrate the tube is also provided with means adapted to cooperate with a cam means on a fixed base in a manner such that the penetration of the knife of knives occurs by pivoting of the support on the carriage in response to translational advancing movement of the carriage. The subsequent retraction of the knife or knives with respect to the tube is accomplished by reverse pivoting of the support.

The apparatus of the present invention is thus particularly simple, original and unique because it is the action of the tube itself which, in the course of its advance, controls and synchronizes operation of the knives. With respect to conventional systems, the apparatus of the present invention eliminates a substantial number of elements such as activation means and sensors.

Another advantage of the present invention is that the installation of such an apparatus on existing machines poses no difficulty; only minor modifications are necessary. The adjustments are simplified, and the capacities in both diameter and thickness of tubes, however, are substantial.

Furthermore, apparatus in accordance with the present invention is very safe because the knives can only be activated only as a tube is actually being manufactured. In addition to the foregoing, specific means for penetration of the knives into the tube and for the return of the support mandrel are provided.

In summary, the present invention provides apparatus for truncating a continuously formed tube that is rotated as it is being formed and has a free end that moves forwardly in an axial direction. The apparatus includes a carriage mounted for translation in said axial direction between forward and rearward postions; and abutment means mounted for translation and engageable with the free end of the tube for movement therewith in the forward direction. Coupling means are provided connecting the carriage to said abutment means for translating said carriage from its rearward position in response to forward movement of the tube. In addition, cutter means are mounted on said carriage for selective transverse movement relative to the axis of said tube; and cam means operatively associated with said cutter means and responsive to forward translation of said carriage impart transverse movement to said cutter means into cutting engagement with said tube whereby the latter is truncated.

An axial mandrel for supporting the tube as it moves forwardly is also provided. In addition, the present invention includes means for translating said carriage back to its rearward position after the tube is truncated, and means for retracting said abutment means before the carriage translates back to its rearward position. The coupling means further includes a linkage element in communication with said carriage, said coupling means being constructed and arranged to be adjustable in length corresponding to the length of the cut work. Said linkage element comprises an actuator having a rod attached to said element and another end fixed to said actuator.

The abutment means is slidably mounted on a shaft. The cutter means includes at least one support pivotally mounted on said carriage for rotation about an axis parallel to the axis of the tube, and a cutter rotatably mounted on said support. Said support is resiliently biased away from the tube such that the cutter is spaced from the tube when the carriage is located at its rearward position.

The cam means includes a surface inclined with respect to the axis of the tube; and the surface has a portion that diverges with respect to the axis of the tube thereby effecting pivotal movement of said support towards the tube and penetration of the cutter thereinto in response to displacement of said carriage toward its forward position. The support has rollers engaged with said cam means which is pivotally mounted and resiliently biased to a first position at which said rollers engage said surface on the cam means when the carriage translates forwardly, said cam means being pivoted to a second position by the carriage when the latter translates rearwardly for maintaining the cutter spaced from the axis of the tube as the carriage returns to its rearward position.

Retraction means are provided for retracting the mandrel after the tube is cut. Such retraction means comprises a structural support, a mandrel attached to the structural support, an actuator, a swivel fastener, and an elongate connecting means, said elongate connecting means being attached at one end to said mandrel by said fastener thereby permitting free rotation of the mandrel and at the other end to said actuator.

The apparatus of the present invention is particularly suited for tubes made from at least one strip of cellulosic material wound around a mandrel on which said work to be cut is placed. Means are proved for guiding the work as it advances.

BRIEF DESCRIPTION OF THE DRAWINGS

The invention will be better understood with reference to the following description which refers to the annexed drawings in which:

FIG. 2 is a perspective three-quarter front view of a portion of a second embodiment of the present invention;

FIG. 3 is a top view of an actuator shown in FIG. 1; and

DESCRIPTION OF PREFERRED EMBODIMENTS

Figure 1:
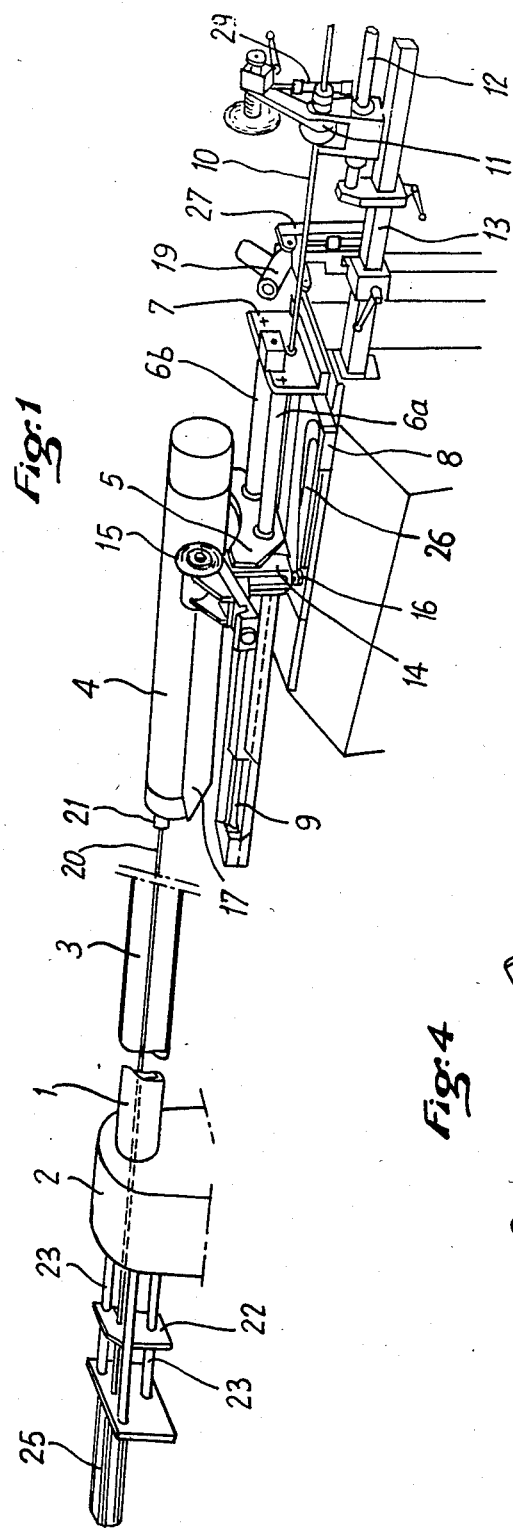
FIG. 1 is a perspective showing of apparatus according to one embodiment of the invention.

FIGS. 1 and 2 relate to slightly different embodiments of apparatus according to the present invention; but similar elements functioning in the same manner are identified by the same reference numeral.

Referring to FIG. 1, the apparatus illustrated comprises winding mandrel 1 which is fixedly attached to stationary support 2. Paper or cardboard strips (not shown) are wound around mandrel 1 to form continuous tube 3. The paper bobbins and the means for advancing or moving tube 3, which are conventional and not part of the invention, are not illustrated.

Support mandrel 4 is made of a relatively hard material; but it is adapted, in the manner discussed below, not to dull the knives used to sever sections from the tube being formed. The cutting apparatus itself comprises carriage 5 longitudinally displaceable on guide shaft means along the axis of tube 3 between a rearward, readiness position, shown in FIGS. 1 and 2, and a more forward, advanced position. The guide shaft means may be in the form of guide shaft 6, as shown in FIG. 2, or two shafts 6a and 6b as shown in FIG. 1. The guide shaft means are rigidly attached to vertical plate 7 which, in turn, is attached to stationary horizontal plate 8.

Referring to FIG. 1, rod 10 of actuator 9 is connected to carriage 5 and extends, slideably, through front plate 7 and abutment 11 which, itself, is adjustably slideably mounted on shaft 12 of support 13. Actuator 9, operating on rod 10, imparts movement to carriage 5.

As shown in FIG. 2, a pair of knife-carrying supports 14 are journalled on each side of carriage 5. Each support 14 is journalled in its median portion on carriage 5 and is provided, at one of its ends, with an adjustable mounting carrying knife 15 in the form of a freely rotatable disk positioned in a plane substantially perpendicular to the axis of tube 3. The other end of support 14 is provided with means, such as roller 16, to control pivotal movement of the knife support.

Knives 15, on supports 14, are coplanar; and the supports are are resiliently biased away from the axis of mandrel 4 towards their position shown in FIGS. 1 and 2, in which the knives are spaced from each other by a distance equal to at least the diameter of tube 3.

Different guide means may be provided for tube 3. Referring to FIG. 1, such guide means are shown as V-shaped trough 17, and V-configured rollers 19. FIG. 2 shows the guide means as wheels 18. In either case, the guide means are generally adjustable in height and width as is appropriate to properly position and support the tube.

Support mandrel 4 is attached at its rearward end to shaft 20 by means rotary connector 21, such as a swivel, which allows free rotation of the mandrel relative to shaft 20. Mandrel 4 is adapted to be positioned in tube 3. Shaft 20, which is likewise positioned in tube 3, passes through tubular winding mandrel 1, its support 2 and plate 22 which is slidably mounted on guides 23.

The rearward end of shaft 20 is provided with abutment 24, shown in FIG. 3, which may slide in plate 22, but which may also be pulled by it. In addition, the end of shaft 20 may comprise a pivotable assembly and disassembly portion at the level of passage of shaft 20.

As generally shown in FIGS. 1 and 3, plate 22 is attached to the end of the rod of actuator 25. It is, however, possible to attach shaft 20 directly to the end of the rod of actuator 25 without resorting to slide plate 22 and to replace all or at least a portion of shaft 20 by a cable. For reasons which will become clear below, this is preferably done in the connection zone of mandrel 4.

As shown in FIG. 2, plate 8 is provided with two cams 26 positioned in cut out portions of the plate. The cams are journalled in a manner so as to pivot while being elastically biased in the position shown to abut on a portion of plate 8 which is not cut out.

Figure 4:
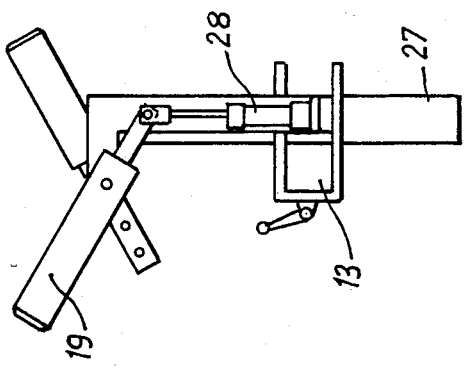
FIG. 4 shows in greater details the guide and ejection rollers shown in FIG. 1.

Guide rollers 19, mounted on support 13 by means of mounting 27 (FIGS. 1 and 4), are also provided with ejection actuator 28. Likewise, abutment 11 is provided with actuator 29 whose function will become clear below.

The various constituent means of the apparatus described above are described below in terms of their operation.

Support mandrel 4 is introduced into tube 3 in the course of manufacture, adjacent to the forward free end of the tube. At the beginning of the cutting cycle, the free end of mandrel 4 progresses forwardly and rotates with tube 3 by reason of the contact between the mandrel and the tube. In FIG. 2, mandrel 4 is shown extending beyond tube 3, but this is merely for the purpose of better visualizing what is occurring. Actually, at the beginning of the truncation cycle, the forward free end of tube 3 extends beyond mandrel 4.

Tube 3 is supported and guided by trough 17, wheels 18 and rollers 19. In the course of its forward longitudinal movement, the front end of tube 3 comes into contact with abutment element 11. In so doing, the free end of the tube displaces the abutment which, by sliding on shaft 12, imparts longitudinal movement to rod 10. The length of rod 10 between carriage 5 and abutment 11 is adjustable in accordance with the desired length for each truncated portion. The carriage is thus translationally driven by the translation of tube 3 and thus moves identically with and at the same velocity as the tube.

As is shown best in FIG. 2, rollers 16 of supports 15 encounter cams 26 in the course of this movement. In their initial position, cams 26 are in a configuration divergent with respect to the axis of the tube and the direction of advancement. Thus, as the rollers travel along this portion of cams 26, they cause supports 14 to pivot toward each other as knives 15 move towards tube 3.

Cams 26 then have a less divergent portion which corresponds to the penetration phase of the knives in the wall of the tube until the knives encounter support mandrel 4. This portion of the cams can be made substantially parallel to the axis of the tube, if the first portion is sufficiently divergent to cause the knives to penetration completely through the tube.

It is important to note that knives 15 are not power driven but are freely rotatable. They are caused to rotate by contact with rotating tube 3. When rollers 16 arrive at the end of the cam surfaces on cams 26, supports 14 are released for resilient pivoting in the other direction retracting the knives from the tube. At about the same time, actuator 29 pivots abutment 11, and actuator 9 causes carriage 5 to move in a reverse direction. Rollers 16 pass behind cams 26, which pivot, to permit the rollers to return towards their initial position.

At essentially this moment, mandrel 4 is pulled rearwardly and actuator 28 pivots one of rollers 19 (FIG. 4) so that the tube portion which has just been cut can be recovered while awaiting the next position. The reversal of mandrel 4 is achieved by the action of actuator 25 which pulls plate 22 and abutment 24 (FIG. 3) rearwardly. In turn, this pulls shaft 20 rearwardly. In order to free mandrel 4 for subsequent truncation operations, actuator 25 pushes plate 22 so that a portion of shaft 20 becomes free to slide in plate 22 in synchronism with the progression of tube 3 and mandrel 4.

As was previously mentioned, at least a portion of shaft 20 can be replaced by a cable so that actuator 25 can pull mandrel 4 and suddenly release it thus causing slack in the cable. In such case, plate 22 is unnecessary. Thus the apparatus is again repositioned for a new cycle. In the meantime abutment element 11 and rollers 19 have returned to their initial positions.

In contrast to prior art devices, the guide elements of the present invention, as described above in reference to its illustration in FIGS. 1–4, are fixed, and the translational activation of the carriage, the penetration of the knives, the rotation of the knives, and the drive of the support mandrel are obtained by the direct or transmitted action of the tube itself. Although the various means cooperate with one another, they are mechanically separate and are not motorized.

Nevertheless, numerous alternatives can be contemplated without going beyond the scope of the invention. Thus, on the one hand, the apparatus can comprise only a single knife or on the other hand, each support can carry a plurality of knives and/or the carriage can comprise a plurality of supports on each side in a manner so as to execute a plurality of cuts simultaneously.

Likewise, cams 26 can assume a configuration and a disposition which does not necessitate their pivoting. Although the invention anticipates freeing the mandrel at the moment of truncation, this could be accomplished in a different manner.

Finally, it is of couse possible to design and provide numerous modifications, attachments and accessories such as a carriage launcher, return shocks, and similar devices useful in conjunction with such an apparatus.

Furthermore, although the invention relates to a truncation apparatus, the concept of the invention extends of course to cardboard tubes made continuously and which are truncated by means of an apparatus similar to that which has been described.

Additionally, although the invention has been described with reference to particular means, materials and embodiments, it is to be understood that the invention is not limited to the particulars disclosed and extends to all equivalents within the scope of the claims.

What is claimed is:

1. Apparatus for truncating a continuously formed tube into sections of tube, said continuously formed tube being rotated as it is being formed and has a free end that moves forwardly in an axial direction, said apparatus comprising:
   (a) a carriage mounted for translation in said axial direction between forward and rearward positions;
   (b) abutment means mounted for translation and engageable with the free end of the tube for movement with the tube in a forward direction, said abutment means being actuated by the free end of the tube;
   (c) coupling means connecting the carriage to said abutment means for translating said carriage from its rearward position in response to forward movement of the tube;
   (d) cutter means mounted on said carriage for selective transverse movement relative to the axis of said tube; and
   (e) cam means operatively associated with said cutter means and responsive to forward translation of said carriage for imparting transverse movement to said cutter means into cutting engagement with said tube whereby the tube is truncated.

2. Apparatus in accordance with claim 1 further comprising an axial mandrel for supporting the tube as the tube moves forwardly.

3. Apparatus in accordance with claim 2 further comprising means for translating said carriage back to said rearward position after the tube is truncated.

4. Apparatus in accordance with claim 3 further comprising means for retracting said abutment means before the carriage translates back to said rearward position.

5. Apparatus in accordance with claim 1 wherein said coupling means further includes a linkage element in communication with said carriage, said coupling means being constructed and arranged to be adjustable in length corresponding to the length of the cut work.

6. Apparatus in accordance with claim 5 wherein said linkage element comprises an actuator having a rod attached to said element and another end fixed to said actuator.

7. Apparatus in accordance with claim 6 wherein said abutment means is slidably mounted on a shaft.

8. Apparatus in accordance with claim 2 wherein said cutter means includes at least one support pivotally mounted on said carriage for rotation about an axis parallel to the axis of the tube, and a cutter rotatably mounted on said support.

9. Apparatus in accordance with claim 8 wherein said support is resiliently biased away from the tube such that the cutter is spaced from the tube when the carriage is located at said rearward position.

10. Apparatus in accordance with claim 8 wherein said cam means includes a surface inclined with respect to the axis of the tube.

11. Apparatus in accordance with claim 10 wherein said surface has a portion that diverges with respect to the axis of the tube thereby effecting pivotal movement of said support toward the tube and penetration of the cutter into said tube in response to displacement of said carriage towards said forward position.

12. Apparatus in accordance with claim 11 wherein said support has rollers engaged with said cam means which is pivotally mounted and resiliently biased to a first position at which said rollers engage said surface on the cam means when the carriage translates forwardly, said cam means being pivoted to a second position by the carriage when the latter translates rearwardly for maintaining the cutter spaced from the axis of the tube as the carriage returns to its rearward position.

13. Apparatus in accordance with claim 2 further comprising retraction means for retracting said mandrel after the tube is cut.

14. Apparatus in accordance with claim 13 wherein said retraction means comprises a structural support, a mandrel attached to the structural support, an actuator, a swivel fastener, and an elongate connecting means, said elongate connecting means being attached at one end to said mandrel by said fastener thereby permitting free rotation of the mandrel and at the other end to said actuator.

15. Apparatus in accordance with claim 2 wherein said tube is at least one strip of cellulosic material wound around said mandrel on which said work to be cut is placed.

16. Apparatus in accordance with claim 1, further comprising means for guiding the work as the work advances.

17. Apparatus in accordance with claim 1 wherein said tube is at least one strip of cellulosic material.

18. Apparatus in accordance with claim 2 wherein said mandrel is in contact with the inner wall of said tube and is adapted to be driven in translation with the inner wall of said tube.

19. Apparatus in accordance with claim 1 wherein said abutment means is adapted to determine the length of the sections of tube.

20. Apparatus in accordance with claim 1 wherein said cutter means includes freely rotatable knives, said knives being caused to rotate by contact with said tube.

* * * * *